United States Patent [19]
Oka et al.

[11] Patent Number: 5,453,817
[45] Date of Patent: Sep. 26, 1995

[54] NEGATIVE FILM MASKING SYSTEM IN PHOTOGRAPHIC PROCESSING AND PRINTING MACHINE

[75] Inventors: Noriyuki Oka; Hiroaki Ikehara, both of Wakayama, Japan

[73] Assignee: Noritsu Koki Co., Ltd., Wakayama, Japan

[21] Appl. No.: 250,465

[22] Filed: May 27, 1994

[30] Foreign Application Priority Data

Jun. 3, 1993 [JP] Japan ................................ 5-133525

[51] Int. Cl.$^6$ .................................................. G03B 27/62
[52] U.S. Cl. ................................................................ 355/75
[58] Field of Search .................................. 355/75, 41, 74

[56] References Cited

U.S. PATENT DOCUMENTS

| | | | |
|---|---|---|---|
| 4,736,228 | 4/1988 | Ito | 355/75 |
| 4,757,353 | 7/1988 | Kitai et al. | 355/44 |
| 4,924,258 | 5/1990 | Tsutsui | 355/75 X |
| 4,965,631 | 10/1990 | Ozawa | 355/75 |
| 5,003,348 | 3/1991 | Howitt | 355/75 |
| 5,328,073 | 7/1994 | Blanding | 226/55 |
| 5,328,074 | 7/1994 | Blanding | 226/55 |

Primary Examiner—Michael L. Gellner
Assistant Examiner—Daniel P. Malley
Attorney, Agent, or Firm—Wenderoth, Lind & Ponack

[57] ABSTRACT

A negative film masking system for use in a photographic processing and printing machine includes a negative film masking assembly formed mainly of a mask and a negative film hold-down and a masking mount to which the negative film masking assembly is located. Photographic prints are produced from a negative film loaded in the negative film masking assembly and having standard size frames and panoramic size frames in random combination. A panoramic size frame is designated by masking both widthwise edges of the film in shooting to make two unexposed regions in a standard frame. The negative film masking system further includes a four-sided film gate aperture in the mask and which is identical in the size to the panoramic size frame and a four-sided film gate aperture in the negative film hold-down which is identical in the size to the four-sided film gate aperture of the mask. Detecting apertures in particular positions of the mask are spaced from the four-sided film gate aperture thereof at locations in the unexposed regions of the panoramic size frame. Detecting apertures in the negative film hold-down communicate with the detecting apertures of the mask.

12 Claims, 11 Drawing Sheets

NEGATIVE FILM MASKING SYSTEM IN PHOTOGRAPHIC PROCESSING AND PRINTING MACHINE

BACKGROUND OF THE INVENTION

The present invention relates to a negative film masking system attachable to a negative film masking mount at the printing station of a known photographic processing and printing machine.

Such a negative film masking system in the photographic processing and printing machine is designed such that while a negative film loaded in a negative film masking assembly is advanced frame by frame, a desired frame of the negative film is halted at a location in alignment with a four-sided film gate aperture (at an exposure location) of the masking assembly and is exposed to produce a print on a sensitized paper and is securely held down by a film hold-down of the masking assembly.

A common photographic negative film of 135 roll or piece form contains standard size frames and panoramic size frames in random combination. Hence, printing of an image of the panoramic size requires the use of a specific mask having a film gate aperture which is identical in size to the panoramic frame.

The use of such a specific mask is essential to measure the transmission of light through the frame with LATD sensors which will be described later. If a portion of light transmitted through unexposed regions of the film is detected, it interrupts correct measurement.

It is a good idea to have the masking system provided with a detector capable of automatically distinguishing a panoramic size frame from a standard size frame on a negative film for ease of printing operation. Although the masking system with such a detector allows the operator to perform a printing operation with ease, the cost of production will be high.

If no such detector is provided with the masking system, the operator has to check a negative film visually for panoramic frames and remember or record the location of such frames to be printed prior to loading the film to the masking system.

The memorization or recording of the location of panoramic frames of the negative film is however troublesome, demanding an extra step in the printing operation. Also, if any panoramic frame is incorrectly recognized or recorded as being of the standard size, it will be exposed in the standard size film gate aperture of the mask, thus causing the processing and printing machine to lose its exposure control.

It is an object of the present invention, in view of the foregoing, to provide a negative film masking system for use in a photographic processing and printing machine, wherein each desired panoramic frame on a negative film loaded in a negative film masking assembly is visibly identified when it is located at the exposure location or one frame before the same, so that exposure through the panoramic size film gate aperture of the masking assembly can successfully be carried out without memorizing or recording the location of the panoramic frames.

SUMMARY OF THE INVENTION

For achievement of the above object, a negative film masking system for use in a photographic processing and printing machine in accordance with the invention includes a negative film masking assembly mainly including a mask and a negative film hold-down and is loaded on a masking mount. Photographic prints are produced from a negative film loaded in the negative film masking assembly and having standard size frames and panoramic size frames in random combination. The panoramic size frame is designated by masking both widthwise edges of the film in shooting to make two unexposed regions in a standard frame. The negative film masking system according to the present invention is characterized by providing a four-sided film gate aperture in the mask which is identical in the size to the panoramic size frame, providing a four-sided film gate aperture in the negative film hold-down which is identical in size to the four-sided film gate aperture of the mask, providing detecting apertures in particular positions of the mask which are spaced from the four-sided film gate aperture therein and in the unexposed regions for the panoramic size frame, and providing detecting apertures in the negative film hold-down which communicate or align with the detecting apertures of the mask. Thus, when a panoramic frame of the film is aligned with the four-sided film gate aperture, of the mask its two unexposed regions of the panoramic frame can be viewed through the detecting apertures of the negative film hold-down, and when a standard size frame is aligned with the four-sided film gate aperture, of the mask it can be viewed and identified through the same.

The detecting apertures of the mask can be located one frame before the four-sided film gate aperture therein. Thus, when a panoramic frame of the film is located one frame before the four-sided film gate aperture, its two unexposed regions can be viewed through the detecting apertures of the negative film hold-down, and when a standard size frame is located one frame before the four-sided film gate aperture, it can be viewed and identified through the same.

The detecting apertures of both the mask and the negative film hold-down can be arranged to extend at a predetermined angle, and such angle can be towards the eyes of an operator. One or more of the detecting apertures can be covered with shading filters.

The detecting apertures in both the mask and the negative film hold-down can be provided in rows. In particular, the detecting apertures in each such row of the negative film hold-down can be separated by louvers which are tilted at the same angle as of the line of vision of an operator.

In operation of the negative film masking system, a desired frame on a negative film to be printed is advanced to the four-sided film gate aperture of the mask and stopped at the exposure location and then is held down by the negative film hold-down. When the desired frame is a panoramic size, it matches the four-sided film gate aperture of the mask with the unexposed regions being located over the detecting apertures of the mask and beneath the detecting apertures of the negative film hold-down.

As a result, a portion of irradiated light enters the detecting apertures of the mask and passes through the unexposed regions for the panoramic size and the detecting apertures of the negative film hold-down to the eyes of the operator. Thus, the panoramic frame on the film at the exposure location can correctly be identified by the operator before controlled exposure to make a print.

If a frame of standard size is advanced to the film gate aperture of the mask, its corresponding portions are located over the detecting apertures of the mask and beneath the detecting apertures of the negative film hold-down and can thus be viewed and identified by the operator who in turn feeds the negative film further to find a succeeding panoramic frame.

When the detecting apertures of the mask are located on a frame before the gate aperture, a desired frame on a negative film to be printed is advanced to the four-sided film gate aperture of the mask and stopped at the exposure location and then is held down by the negative film hold-down. When the succeeding frame after the present frame at the exposure location is a panoramic size, the unexposed regions for the panoramic size are located over the detecting apertures of the mask and beneath the detecting apertures of the negative film hold-down.

As a result, a portion of the irradiated light enters the detecting apertures of the mask and passes through the unexposed regions for the panoramic size and the detecting apertures of the negative film hold-down to the eyes of the operator. Thus, the succeeding frame after the present frame or one frame before the exposure location can correctly be identified as a panoramic size by the operator.

If a frame of the standard size is advanced to one frame before the film gate aperture of the mask, its corresponding portions are located over the detecting apertures of the mask and beneath the detecting apertures of the negative film hold-down and can thus allow the operator to judge that the succeeding frame is a standard size.

When the detecting apertures of both the mask and the negative film hold-down can be arranged to extend not vertically but at the predetermined angle, any portion of the irradiated light passing the detecting apertures will not be detected by the sensors of an exposure control unit.

When the detecting apertures of the mask and the negative film hold-down are arranged to extend at an angle towards the eyes of an operator, this allows the operator to intercept with ease any portion of the irradiated light passing the detecting apertures.

When one or more of the detecting apertures are covered with shading filters, a portion of the irradiated light passing the detecting apertures is decreased in brightness and will hardly be sensed by sensors of the exposure control unit.

When rows of detecting apertures provided in both the mask and the negative film hold-down are formed of rectangular configuration and those in the negative film hold-down are separated by louvers which extend lengthwise of the detecting aperture, ease of viewing the unexposed regions for the panoramic size is improved. The louvers can be tilted at the same angle as the line of vision of the operator and thus will not prevent the operator from performing exposure control.

DETAILED DESCRIPTION OF PREFERRED EMBODIMENTS

FIGS. 1 to 12 illustrate a first embodiment of the present invention.

Figure 11:
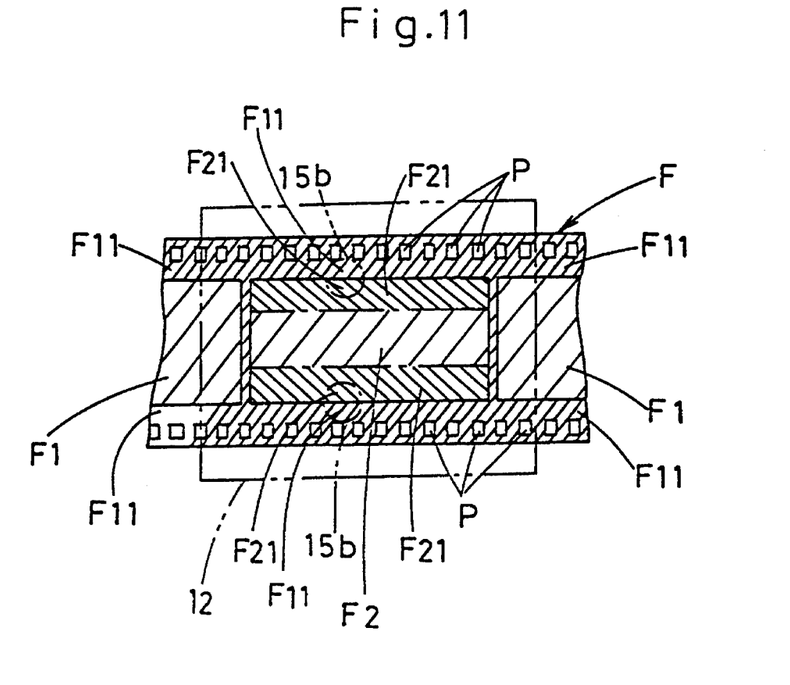
FIG. 11 is a plan view of the negative film masking system of the first embodiment of the present invention illustrating an operation thereof.

A photographic processing and printing machine denoted by A is provided for making prints from a negative film F which includes at random order standard size pictures F1 and panoramic size pictures F2 (FIG. 11).

The standard size picture F1 is an image frame of the standard size, 24 mm×36 mm, on a known 135 35-mm film having series of perforations P at both edges. The panoramic size picture F2 is a rectangular image on a 135 film having a size 13 mm×36 mm and is reduced in the width direction by about 5 mm from both sides.

Figure 1:
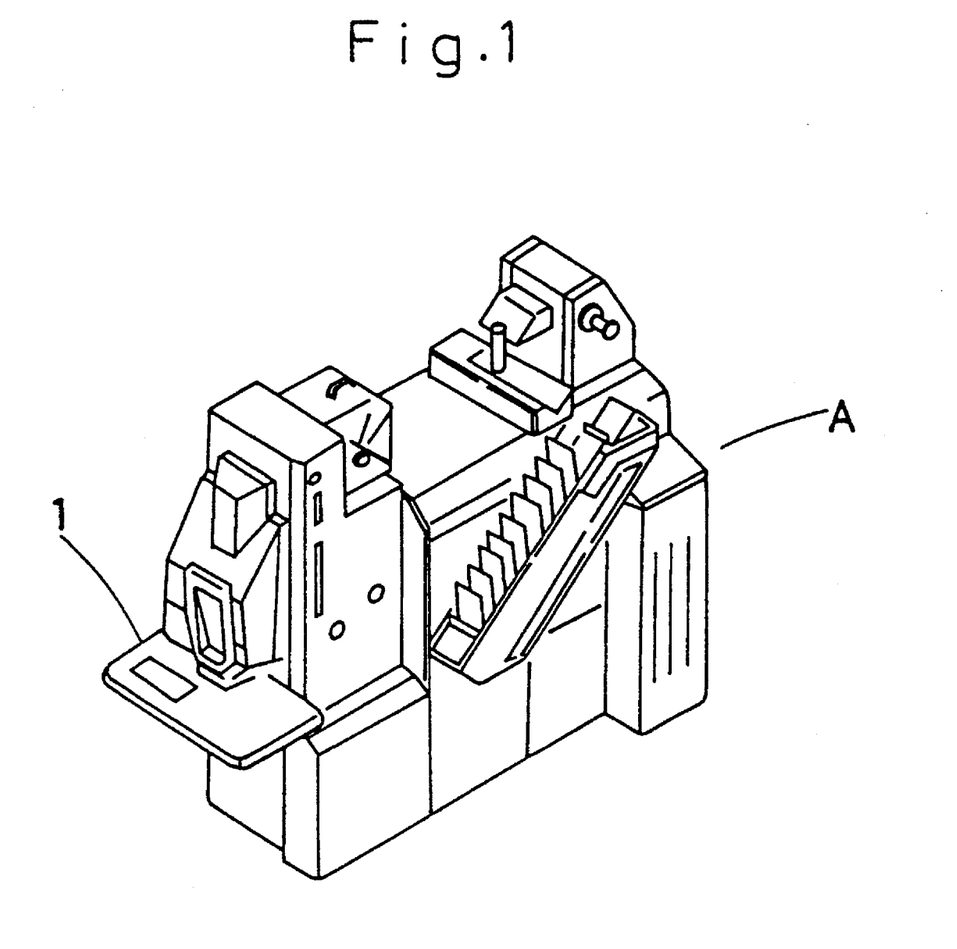
FIG. 1 is a perspective view of an overall photographic processing and printing machine relating to the present invention.
Figure 2:
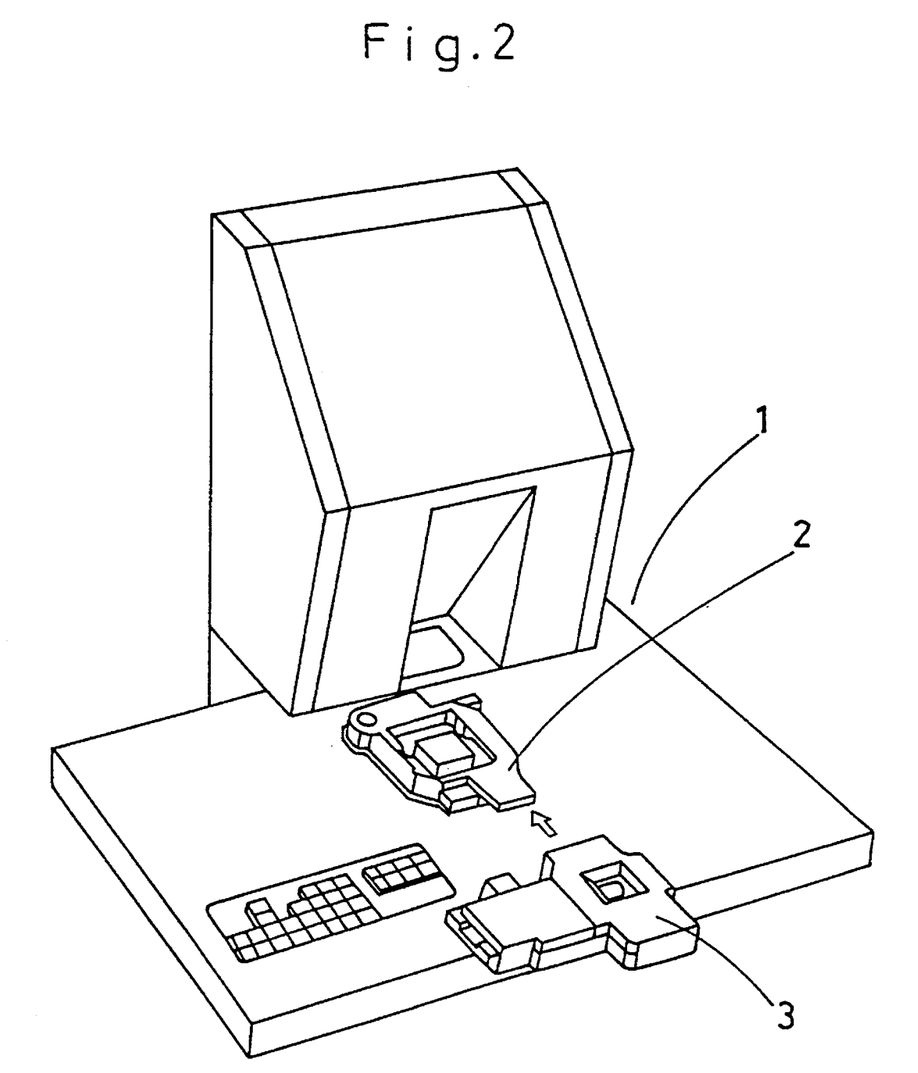
FIG. 2 is a perspective view of a printing station of the photographic processing and printing machine.

FIG. 1 is a perspective view of the photographic processing and printing machine A where a negative masking mount 2 best shown in FIG. 2 is installed at the center of a printing station 1.

Figure 3:
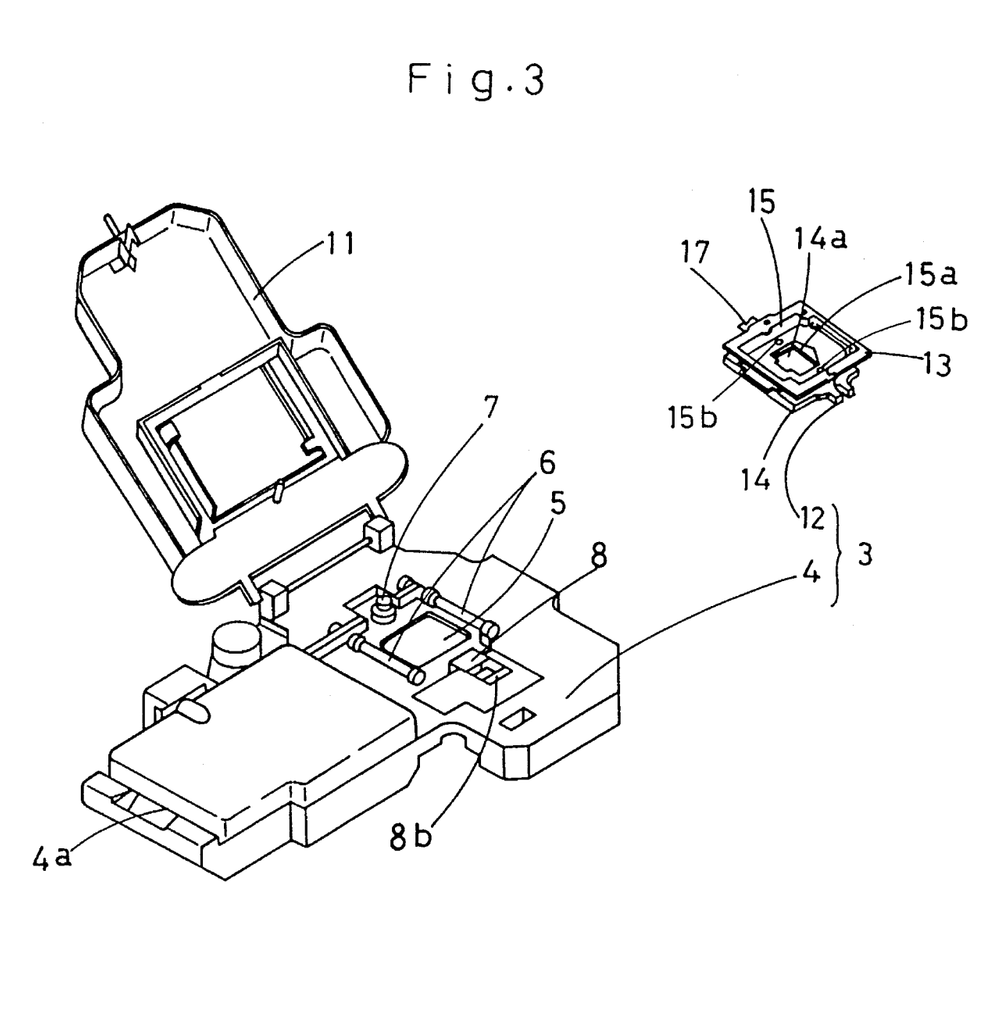
FIG. 3 is a perspective view showing a first embodiment of the present invention.

As shown in FIG. 2, there is provided an automatic negative masking unit 3 which comprises a unit body 4 and a negative masking assembly 12 (FIG. 3).

Figure 4:
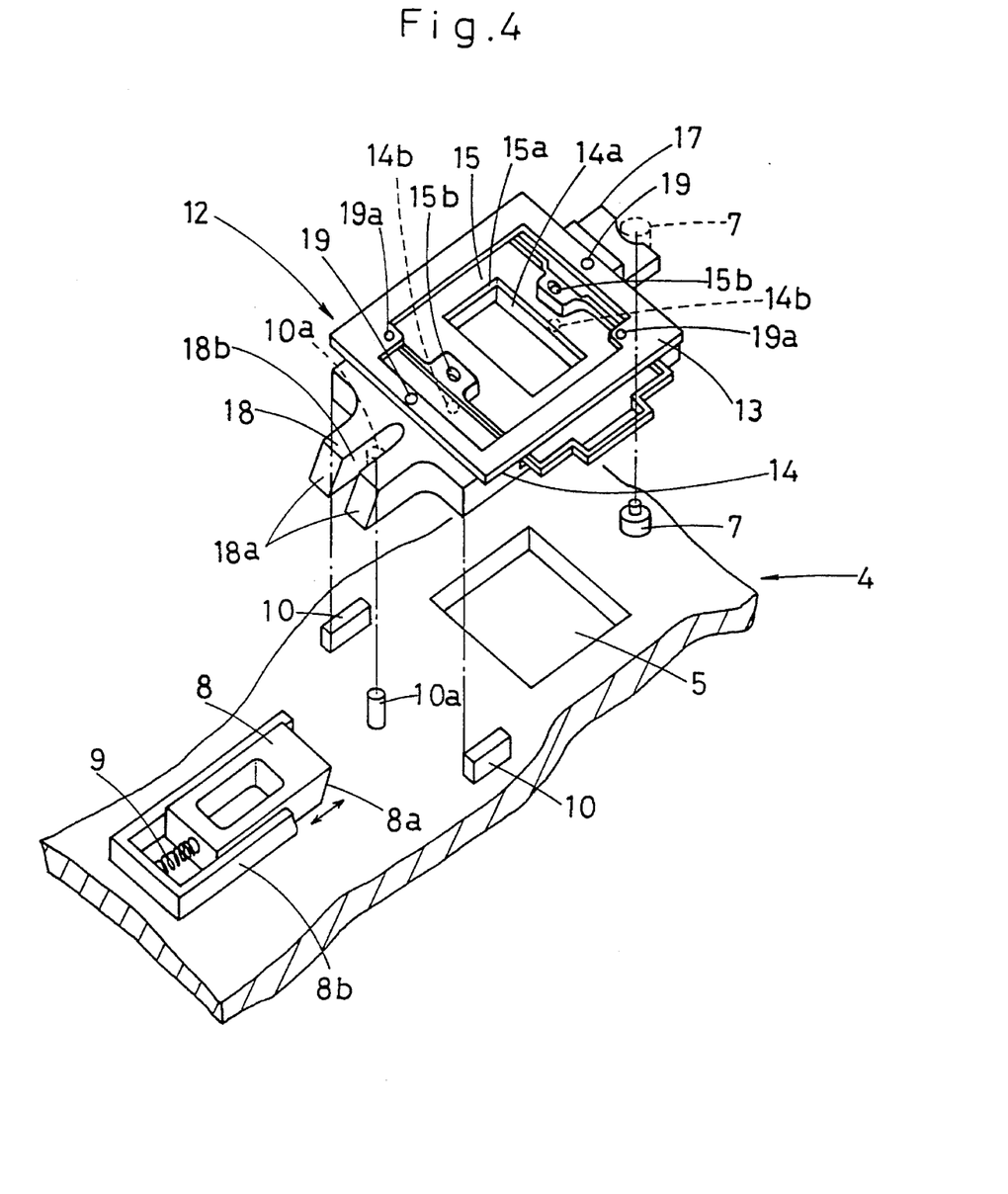
FIG. 4 is a perspective view showing a primary part of the first embodiment of the present invention.

The unit body 4 has a four-sided opening 5 therein and incorporates an image detecting sensor, a frame feeder, and other relevant mechanisms which are automatically actuated through calculation and control with a computer in the photographic processing and printing machine A when the unit body 4 is loaded on and electrically connected to the negative masking mount 2, as shown in FIGS. 3 and 4.

Two frame feeding rollers 6 are disposed at the leading and trailing ends of the four-sided opening 5 across the feeding direction of the negative film F. There are a fitting pin 7 provided on one side of the four-sided opening 5 of the unit body 4 for serving as an engaging member and a latch 8 provided on the other side, both being aligned across the film feeding direction. The latch 8 remains urged by a spring 9 to move forward along a guide 8b. The latch 8 has at a front end an engaging slope or downwardly inclined or beveled surface 8a. A pair of mounting guides 10 are disposed at a distance from each other on the side of the four-sided opening 5 for loading the negative masking assembly 12. There is a guide pin 10a disposed between the two mounting guides 10 on a center line of the movement of the latch 8.

The unit body 4 also has a cover 11 pivoted for opening and closing movement.

Figure 5:
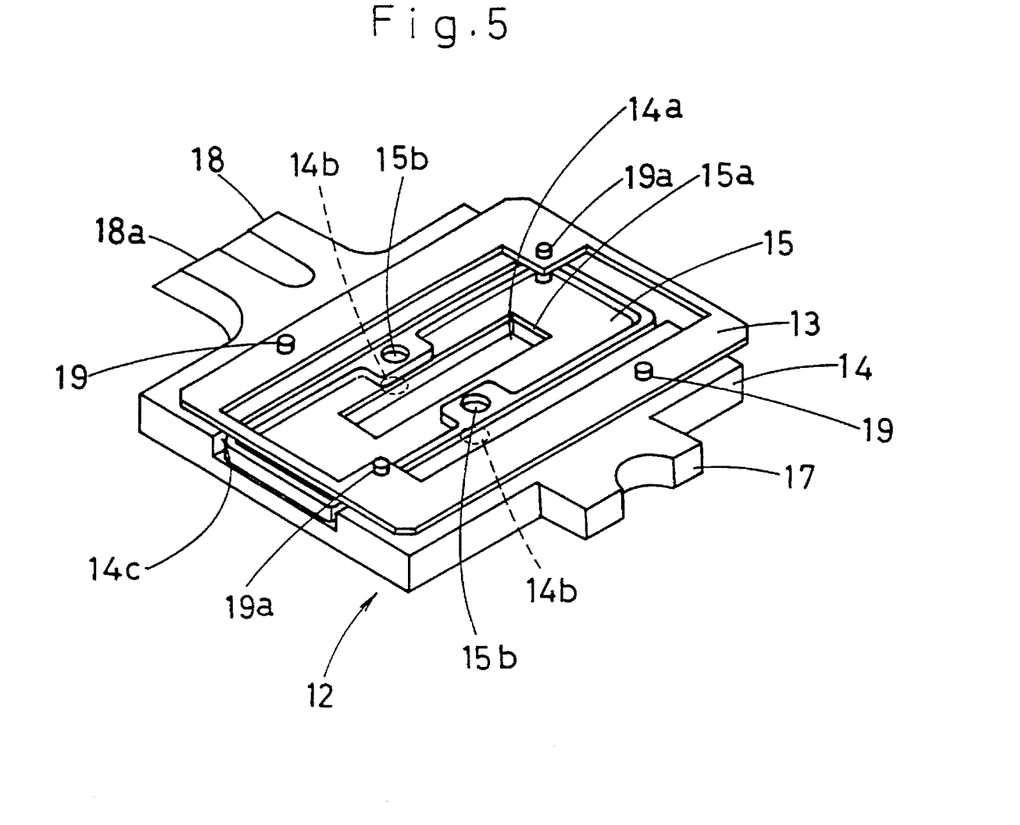
FIG. 5 is a perspective view showing a negative film masking assembly of the first embodiment of the present invention.

The negative masking assembly 12 comprises a negative film hold-down frame 13, a mask or mask member 14, and a negative film hold-down or hold down 15.

The mask 14 has at the center thereof a four-sided gate aperture 14a equal to the size of the panoramic frame F2.

Also, a pair of detecting apertures 14b are provided in the mask 14 on both sides of aperture 14a in the feeding direction of the negative film F (at exposure shielding regions).

In this embodiment, the detecting apertures 14b of the mask 14 are determined so that when the panoramic frame F2 of the negative film F is located in over the four-sided gate aperture 14a, unexposed regions F21 of frame F2 partially cover the respective detecting apertures 14b and more specifically, a half of each detecting aperture 14b is closed by a respective unexposed region F21 of the panoramic frame F2 of film F.

Figure 9:
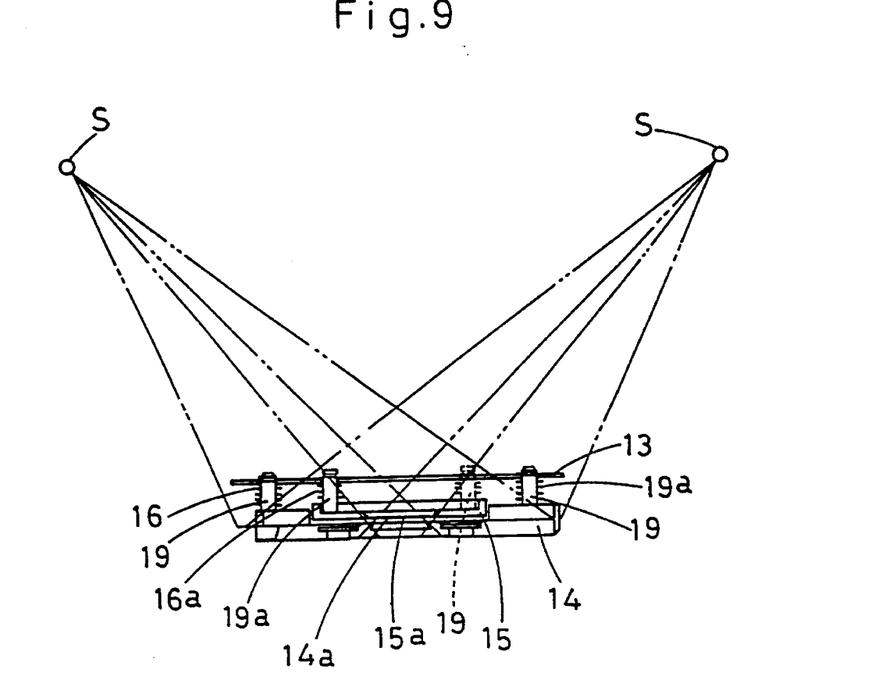
FIG. 9 is a longitudinal cross sectional view of the negative film masking system of the first embodiment of the present invention illustrating an operation thereof.
Figure 10:
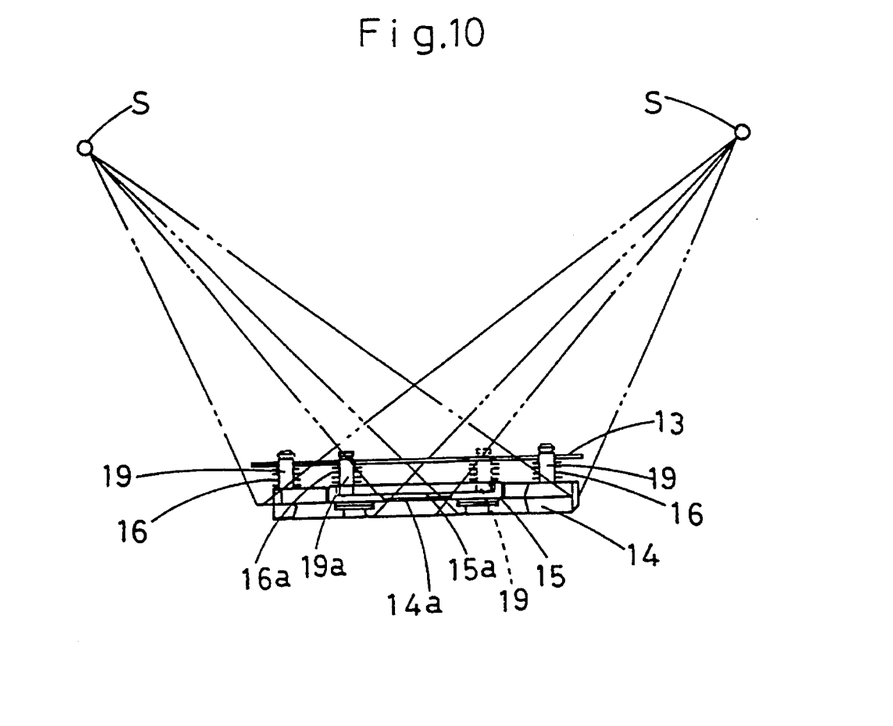
FIG. 10 is a longitudinal cross sectional view of the negative film masking system of the first embodiment of the present invention illustrating another operation thereof.

The negative film hold-down frame 13 is positioned by support pins 19 extending from the upper surface of the mask 14 and remains urged upwardly by coil springs 16 (FIGS. 9, 10).

Similarly, the negative film hold-down 15 is positioned by support pins 19a extending from the lower surface of the negative film hold-down frame 13 and remains urged by coil springs 16a downwardly against the mask 14.

The negative film hold-down 15 also has therein a four-sided gate aperture 15a corresponding to the four-sided gate aperture 14a of the mask 14. In addition, two detecting apertures 15b are provided on both sides of the four-sided gate aperture 15a in the negative film hold-down 15 so that they communicate, i.e. align, with respective of the two detecting apertures 14b of the mask 14.

Figure 6:
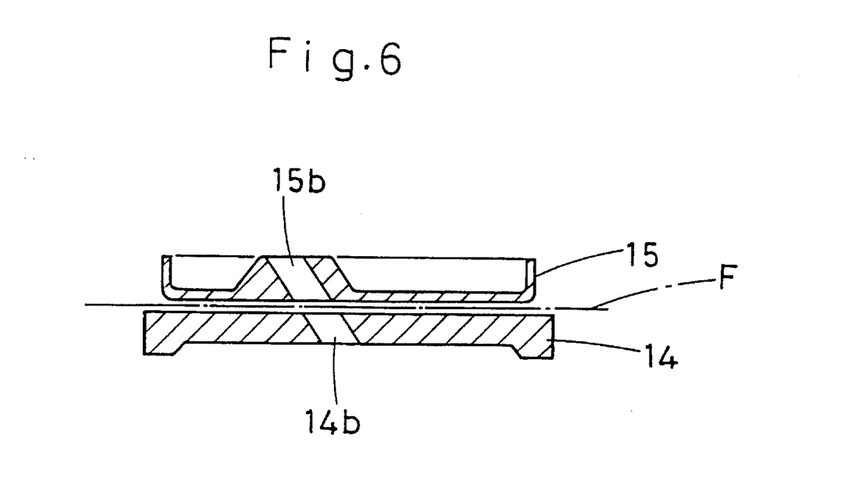
FIG. 6 is a cross sectional view of the negative film masking assembly of the first embodiment of the present invention.
Figure 7:
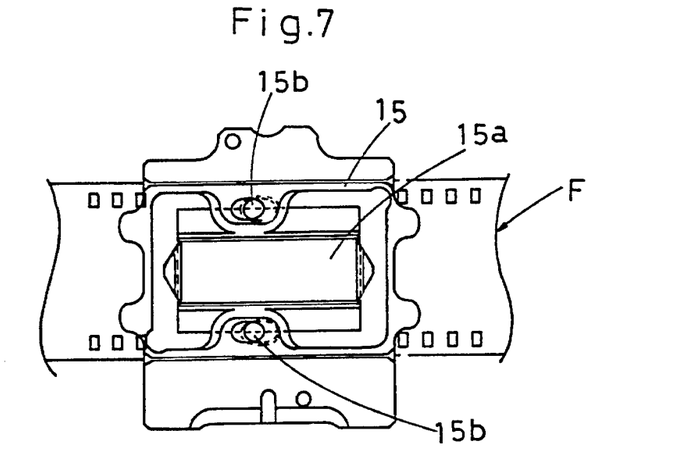
FIG. 7 is a plan view showing an operation of a negative masking system of the first embodiment of the present invention.
Figure 8:
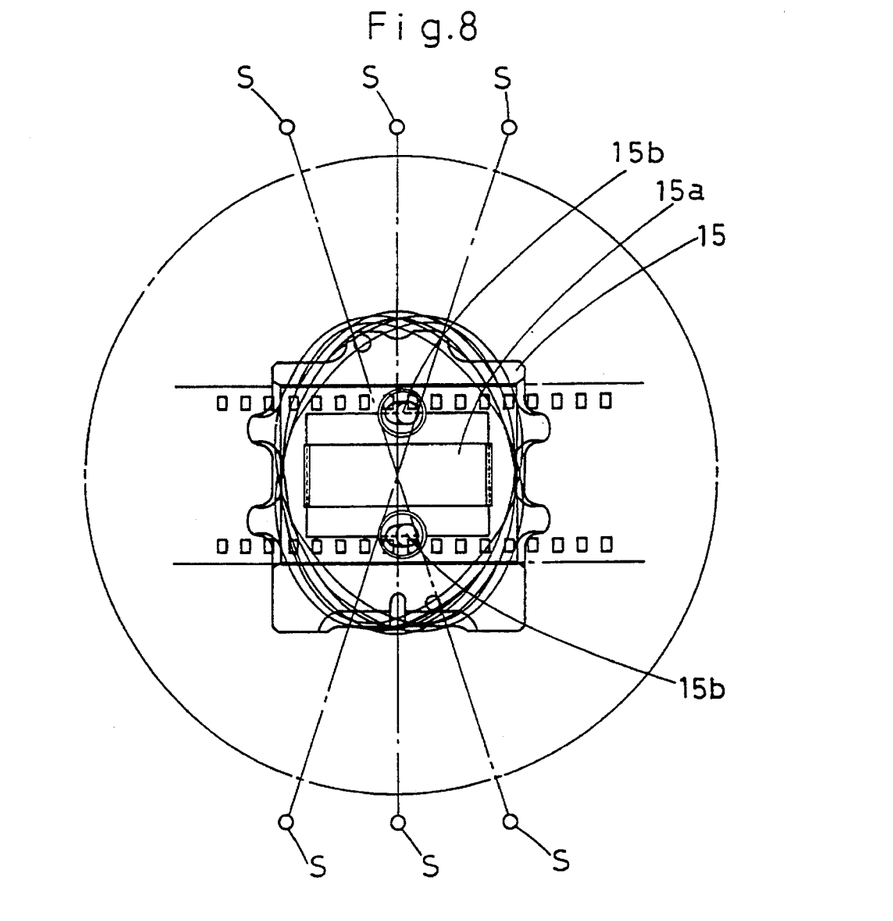
FIG. 8 is a plan view showing an operation on the negative film masking system of the first embodiment of the present invention.

The detecting apertures 15b in the negative film hold-down 15 are arranged to extend at 45 degrees to the vertical for giving high visibility to an operator during a detecting operation (see FIGS. 6–8). The angle of the apertures 15b may be changed to meet any other design requirements.

There is a distance or space between the mask 14 and the negative film hold-down 15 for passing therebetween the negative film F. An engaging projection 17 having a recess at the distal end is outwardly provided on one side of the mask 14 of the negative masking assembly 12 and an engaging member 18 is provided on the other side thereof. The engaging member 18 has at the center thereof an outwardly opening slot 18b and at a distal end thereof engaging slopes or inclined surfaces 18a on both sides of the slot 18b and which are beveled upwardly.

The mounting of the negative masking assembly 12 to the unit body 4 will be described.

As shown in FIGS. 3 to 5, after opening the cover 11 of the unit body 4, the engaging projection 17 of the negative masking assembly 12 is fitted on the fitting pin 7 of the unit body 4. While the latch 8 of the unit body 4 is moved outwardly against the urging force of the spring 9, the negative masking assembly 12 is lowered with the slot 18b of the engaging member 18 accepting the guide pin 10a. The negative masking assembly 12 is then positioned and held between the two mounting guides 10 on the unit body 4. When released, the latch 8 moves forwardly and is urged with its front slope or inclined surface 8a against the engaging slopes or inclined surface 18a of the engaging member 18 of the assembly 12. Accordingly, the negative masking assembly 12 remains urged to a correct position thereof on the unit body 4.

The negative film F is then fed to pass horizontally in the feeding direction between the mask 14 and the negative film hold-down 15 of the negative masking assembly 12 by being pressed and driven by the feeding rollers 6.

The printing operation starts with loading of the automatic negative masking unit 3 carrying the masking assembly 12 onto the negative film masking mount 2 in the printing station 1 of the photographic processing and printing machine before feeding of the negative film F to be printed.

Denoted by S in FIGS. 9 and 10 are LATD sensors.

The exposure required for making prints on a sensitized paper from the color negative film F is determined by a ratio between the irradiation of light from a light source falling on a desired image frame of the negative film F at the four-sided gate aperture 15a and the transmission of light passed through the film F. The transmission of light (including B, G, and R color components) passed through the image frame of the negative film F is measured with the LATD sensors S.

LATD stands for Large Area Transmittance Density which means an average transmittance density.

The steps of operation of the negative masking system of this embodiment will now be described.

1. The masking assembly 12 for panoramic images F2 is loaded and set in the unit body 4 of the negative film masking unit 3.

2. The leading end of a negative film F is inserted into a film guide passage through a film feeding inlet 4a of the unit body 4 (FIG. 3).

3. The negative film F is advanced by the feeding rollers 6 powered by a motor (not shown).

4. Advance of the negative film F is halted to locate a desired frame thereof in at the four-sided gate aperture 14a of the mask 14 (at the exposure location as shown in FIG. 9). Such frame is securely pressed down by the negative film hold-down 15 to prevent the frame from being undulated (FIG. 10).

When a panoramic frame F2 of the negative film F is located in alignment with the four-sided gate aperture 14a of the mask 14, the light passed through the unexposed regions F21 of the panoramic frame F2 is directed from the detecting apertures 15b of the film hold-down 15 to the eyes of the operator who can in turn judge that the image frame at the four-sided gate aperture 14a or at the exposure location is an image of the panoramic size F2.

5. After such detection, the panoramic frame F2 is exposed to controlled irradiation of light.

Figure 12:
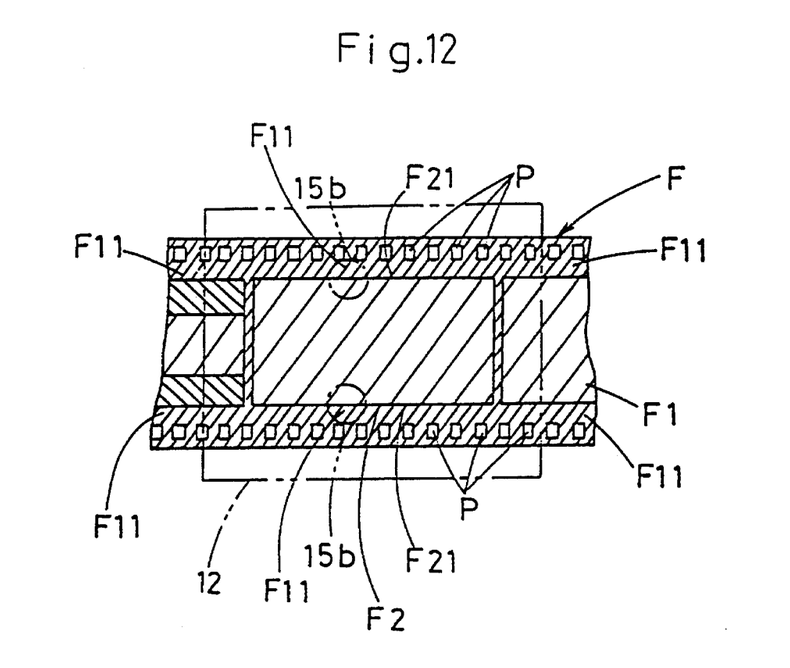
FIG. 12 is a plan view of the negative film masking system of the first embodiment of the present invention illustrating another operation thereof.

6. If a standard size frame F1 of the negative film F comes to be aligned with the four-sided gate aperture 14a of the mask 14, half of each detecting aperture 15b is interrupted by an unexposed region F11 outside the standard image frame F1 of the negative film F (i.e. a second portion of each such aperture while the other half is occupied by the image frame F1 (i.e. a first portion of each such aperture) (FIG. 12).

Accordingly, the light passed through the standard image frame F1 in the detecting apertures 14b is directed from the detecting apertures 15b of the film hold-down 15 to the eyes of the operator which can thus judge that the image frame at the exposure location is an image of the standard size F1.

7. After such detection, the negative film F is further advanced to the next frame of the panoramic size F2.

In the latter case, both the unexposed region F11 and the standard frame F1 appear in the detecting aperture 15b (FIG. 11) allowing the operator to view and identify the content of the standard frame F1 for ease of the printing operation.

Figure 13:
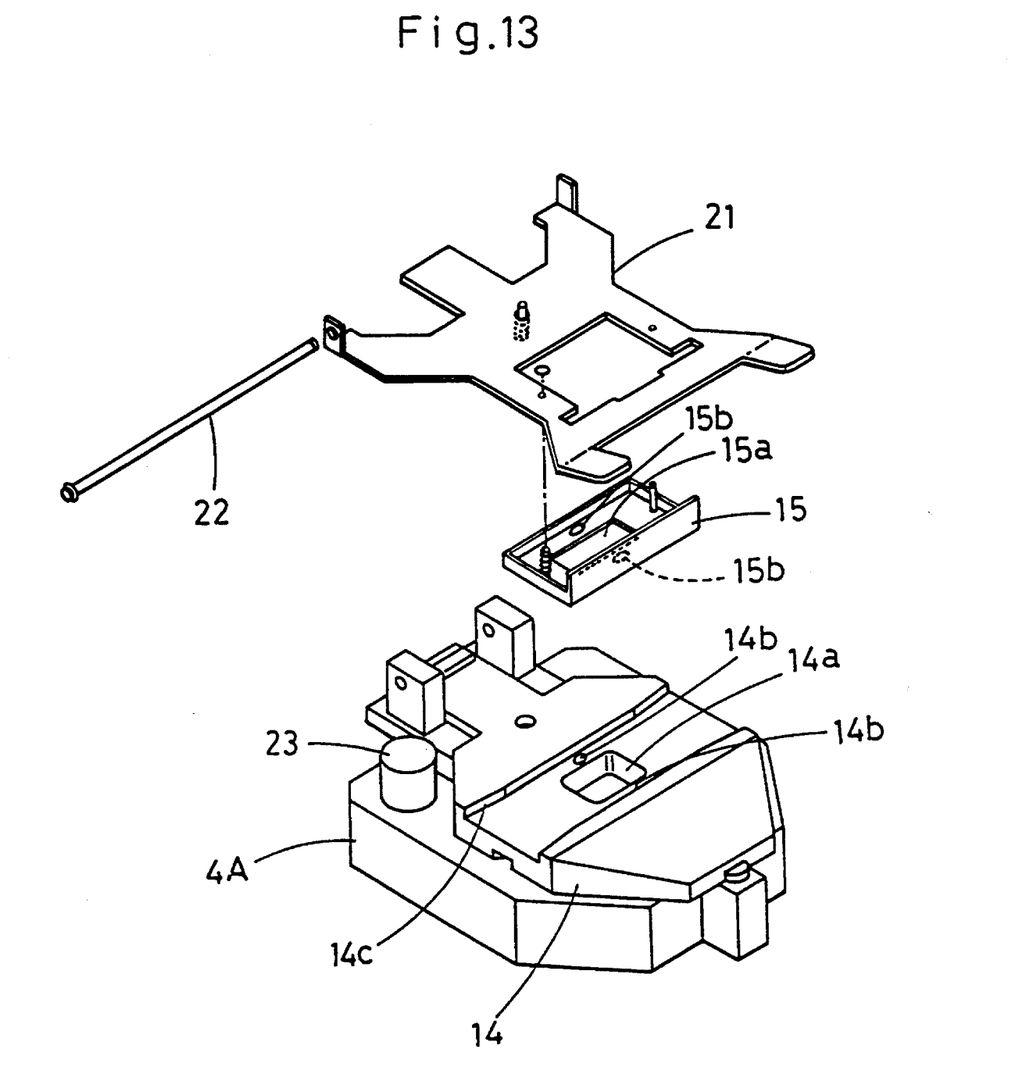
FIG. 13 is an exploded perspective view of a negative film masking system of a second embodiment of the present invention.

A second embodiment of the present invention will be described referring to FIG. 13.

The second embodiment employs a manual type of the negative masking unit.

A mask 14 to be loaded on a negative film masking mount 4A has a negative film guide recess 14c provided therein.

A pressure plate 21 is pivotably mounted by a pin 22 to the mask 14 for upward and downward pivoting movement. A solenoid 23 for actuating the pressure plate 21 is disposed on the negative film masking mount 4A.

When the solenoid 23 is magnetized, it causes the pressure plate 21 to swing downwardly so that a negative film hold-down 15 mounted to the pressure plate 21 presses down the negative film F.

The mask 14 also has therein a four-sided gate aperture 14a and a pair of detecting apertures 14b provided on both sides of the four-sided gate aperture 14a.

Similarly, the negative film hold-down 15 has at a center thereof a four-sided gate aperture 15a and two detecting apertures 15b provided on both sides of the four-sided gate aperture 15a for communication or alignment with the detecting apertures 14b of the mask 14.

As will be understood, the manual type of negative film masking unit of the second embodiment allows the operator to determine whether or not the image frame at the exposure location is an image of the panoramic size F2 by viewing through the detecting apertures 14b and 15b.

Figure 14:
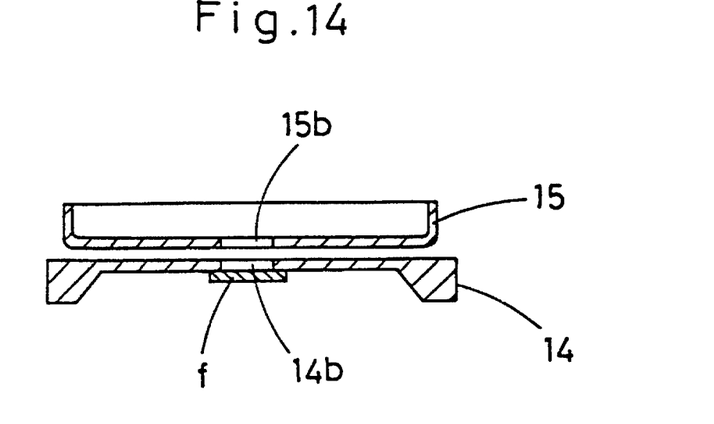
FIG. 14 is a cross sectional view of a primary view of a negative film masking assembly of a third embodiment of the present invention.

A third embodiment of the present invention will now be described referring to FIG. 14.

In this embodiment, the detecting apertures 14b of a mask 14 are arranged to extend not at an angle but perpendicular to the mask 14, and the detecting apertures 15b of a negative film hold-down 15 extend perpendicular thereto.

The detecting apertures 14b of the mask 14 are covered by shading filters f which are preferably ND filters.

As the detecting apertures 14b are provided with the shading filters f, a portion of the irradiation of light during printing is prevented from passing through the detecting apertures 14b and 15b and entering directly the LATD sensors. This will eliminate erratic sensing action by the LATD sensors.

It is understood that the shading filter f is not limited to ND filters, and any appropriate filters, e.g. color filters, capable of preventing erratic sensing action by the LATD sensors may be used with equal success.

The other components and their arrangement of the third embodiment are identical to those of the previous embodiments and will not be discussed.

Figure 15:
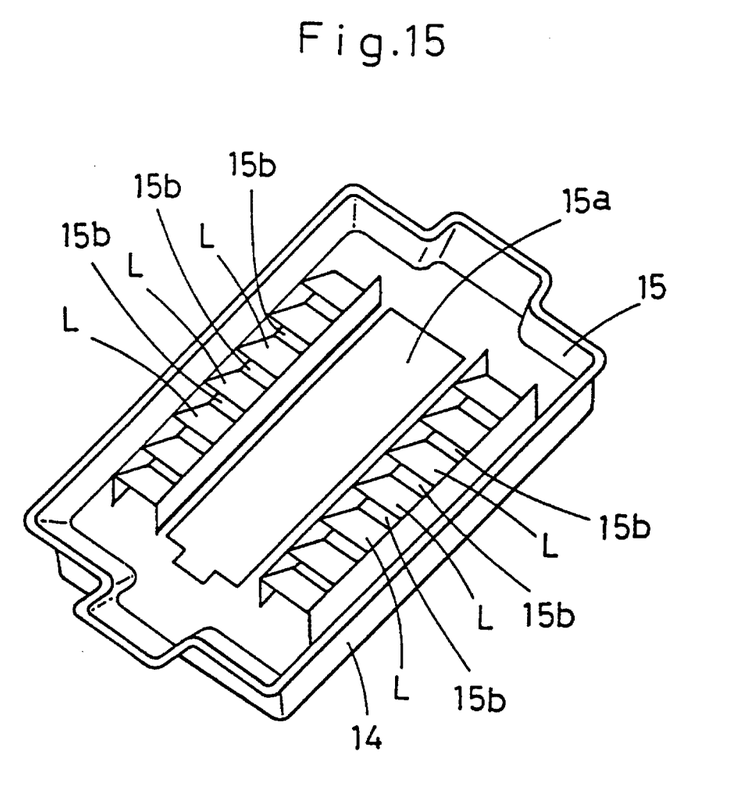
FIG. 15 is a perspective view of a primary part of a negative film masking assembly of a fourth embodiment of the present invention.
Figure 16:
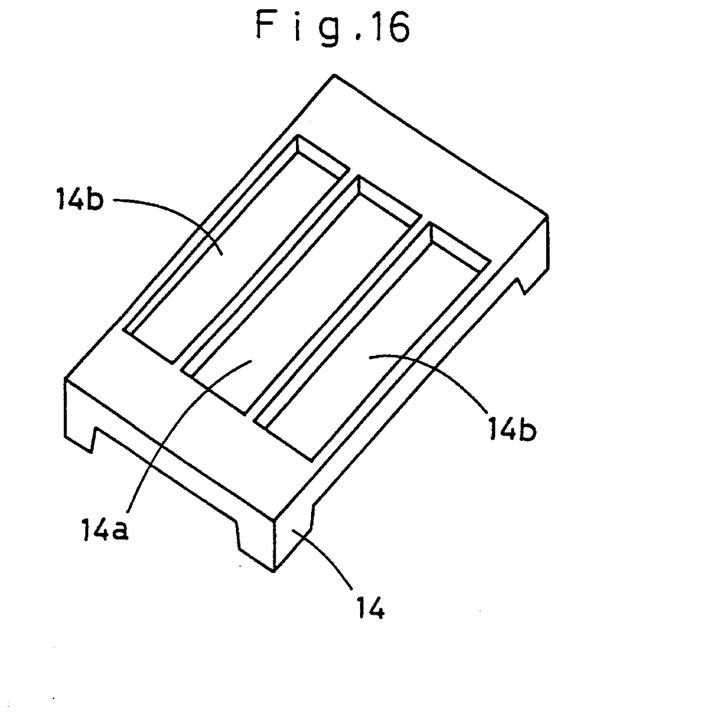
FIG. 16 is a perspective view of a primary part of the negative film masking assembly of the fourth embodiment of the present invention.

A fourth embodiment of the present invention will be described referring to FIGS. 15 and 16.

A mask 14 has a pair of detecting apertures 14b provided on both sides (at exposure shielding regions) of a four-sided film gate aperture 14a. The detecting apertures 14b are each of a rectangular configuration extending in the feeding direction of the negative film F.

A negative film hold-down 15 has at a center thereof a four-sided gate aperture 15a corresponding to the four-sided gate aperture 14a of the mask 14. Also, two rows of detecting apertures 15b are provided on both sides of the gate aperture 15b of the negative film hold-down 15 for communication with the detecting apertures 14b of the mask 14.

Each of the detecting apertures 15b is of a rectangular configuration having its longer sides extending at a right angle to the feeding direction of the film F.

The detecting apertures 15b in each row are separated from each other by louvers L.

In operation, when a desired panoramic frame F2 of the negative film F is halted in position at the four-sided gate aperture 14a (at the exposure location) of the mask 14, its unexposed regions F21 cover the detecting apertures 14b just beneath the detecting apertures 15b of the negative film hold-down 15. A portion of the irradiation of light is thus passed through the unexposed regions F21 of the panoramic frame F2 in the detecting apertures 14b and is directed by the louvers L from the detecting apertures 15b to the eyes of the operator.

The other components and their arrangement in the fourth embodiment are identical to those of the previous embodiments and will not be discussed.

Figure 17:
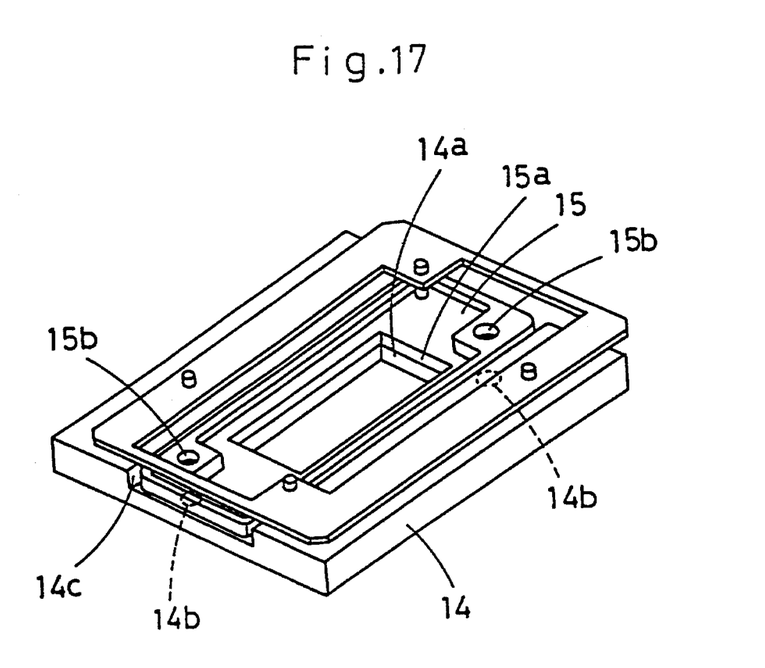
FIG. 17 is a perspective view of a negative film masking assembly of a fifth embodiment of the present invention.

A fifth embodiment of the present invention will now be described referring to FIG. 17.

A mask 14 has at a center thereof a four-sided film gate aperture 14a equal to the panoramic frame F2 and a pair of detecting apertures 14b on both the left and right sides (at exposure shielding regions) of the outside leading and trailing ends of the film gate aperture 14a.

Similarly, a negative film hold-down 15 has at a center thereof a four-sided film gate aperture 15a corresponding to the film gate aperture 14a of the mask 14. Also, a pair of detecting apertures 15b are provided in the negative film hold-down 15 for communication with the detecting apertures 14b of the mask 14.

In operation, when a succeeding frame of a present frame of the negative film F held at the film gate aperture 14a (at the exposure location) is an image of the panoramic size F2, its unexposed region F21 covers the detecting aperture 14b of the mask 14 as being located just beneath the detecting aperture 15b of the film hold-down 15.

Accordingly, a portion of the irradiation of light during printing is passed through the unexposed region F21 of the succeeding panoramic frame F2 in the detecting aperture 14b of the mask 14 and is directed from the detecting aperture 15b of the film hold-down 15 to the eyes of the operator who can thus determine that the succeeding frame is an image of the panoramic size F2.

If the succeeding frame of the negative film F is an image of the standard size F1, it covers the detecting aperture 14b of the mask 14 located just beneath the detecting aperture 15b of the film hold-down 15.

Hence, a portion of the irradiation of light is passed through an exposed region of the succeeding standard frame F1 in the detecting aperture 14b of the mask 14 and is directed from the detecting aperture 15b of the film hold-down 15 to the eyes of the operator who can thus determine that the succeeding frame is an image of the standard size F1.

After such detection, the succeeding panoramic frame F2 of the negative film F is advanced to the exposure location and printed.

The other components and their arrangement in the negative film masking system of this embodiment are identical to those of the first embodiment and will not be discussed.

We claim:

1. A negative film masking system to be employed in a photographic processing and printing machine to enable production thereby of photographic prints from randomly arranged standard size frames and panoramic size frames of a negative film, each standard size frame having a greater width than a panoramic size frame as a result of, during exposure to form the panoramic frame, masking opposite edge portions of a standard size frame to thereby produce two unexposed film regions on opposite sides of the resultant panoramic size frame, said system comprising:

a masking mount;

a negative film masking assembly to be loaded to said masking mount and including a mask member and a hold-down member between which the negative film is to be passed;

said mask member and said hold-down member having therein respective four-sided gate apertures identical in size to the panoramic size frame and at respective positions in alignment with each other and to align with the panoramic size frame;

said mask member having therein detecting apertures at positions spaced from opposite sides of the respective said four-sided gate aperture therein;

said hold-down member having therein detecting apertures at positions spaced from opposite sides of the respective said four-sided gate aperture therein; and said detecting apertures in said hold-down member being aligned with said detecting apertures in said mask member at locations such that, when a standard size frame is therebetween, opposite lateral edges of the standard size frame will align with respective said detecting apertures under an operator detectable condition that first portions of said detecting apertures are covered by the standard size frame and second portions of said detecting apertures are covered by unexposed film regions on opposite lateral sides of the standard size frame, and such that, when a panoramic size frame is therebetween, opposite lateral edges of the panoramic size frame will be positioned laterally inwardly of respective said detecting apertures under an operator detectable condition that said detecting apertures are entirely covered by the unexposed film regions on opposite sides of the panoramic size frame.

2. A system as claimed in claim 1, wherein said locations of said detecting apertures of said mask member are located one frame before said four-sided film gate aperture thereof.

3. A system as claimed in claim 1, wherein said detecting apertures of both said mask member and said hold-down member extend at a predetermined angle.

4. A system as claimed in claim 1, wherein said detecting apertures of both said mask member and said hold-down member extend at an angle to extend toward eyes of the operator.

5. A system as claimed in claim 1, wherein said detecting apertures of at least one of said mask member and said hold-down member are covered with shading filters.

6. A system as claimed in claim 1, wherein said detecting apertures in said hold-down member are provided with louvers tilted at an angle to correspond to an angle of line of vision of the operator.

7. A negative film masking assembly to be mounted on a masking mount of a negative film masking system to be employed in a photographic processing and printing machine to enable production thereby of photographic prints from randomly arranged standard size frames and panoramic size frames of a negative film, each standard size frame having a greater width than a panoramic size frame as a result of, during exposure to form the panoramic frame, masking opposite edge portions of a standard size frame to thereby produce two unexposed film regions on opposite sides of the resultant panoramic size frame, said assembly comprising:

a mask member and a hold-down member between which the negative film is to be passed;

said mask member and said hold-down member having therein respective four-sided gate apertures identical in size to the panoramic size frame and at respective positions in alignment with each other and to align with the panoramic size frame;

said mask member having therein detecting apertures at positions spaced from opposite sides of the respective said four-sided gate aperture therein;

said hold-down member having therein detecting apertures at positions spaced from opposite sides of the respective said four-sided gate aperture therein; and said detecting apertures in said hold-down member being aligned with said detecting apertures in said mask member at locations such that, when a standard size frame is therebetween, opposite lateral edges of the standard size frame will align with respective said detecting apertures under an operator detectable condition that first portions of said detecting apertures are covered by the standard size frame and second portions of said detecting apertures are covered by unexposed film regions on opposite lateral sides of the standard size frame, and such that, when a panoramic size frame is therebetween, opposite lateral edges of the panoramic size frame will be positioned laterally inwardly of respective said detecting apertures under an operator detectable condition that said detecting apertures are entirely covered by the unexposed film regions on opposite sides of the panoramic size frame.

8. An assembly as claimed in claim 7, wherein said locations of said detecting apertures of said mask member are located one frame before said four-sided gate aperture thereof.

9. An assembly as claimed in claim 7, wherein said detecting apertures of both said mask member and said hold-down member extend at a predetermined angle.

10. An assembly as claimed in claim 7, wherein said detecting apertures of both said mask member and said hold-down member extend at an angle to extend toward eyes of the operator.

11. An assembly as claimed in claim 7, wherein said detecting apertures of at least one of said mask member and said hold-down member are covered with shading filters.

12. An assembly as claimed in claim 7, wherein said detecting apertures in said hold-down member are provided with louvers tilted at an angle to correspond to an angle of line of vision of the operator.

* * * * *